UNITED STATES PATENT OFFICE.

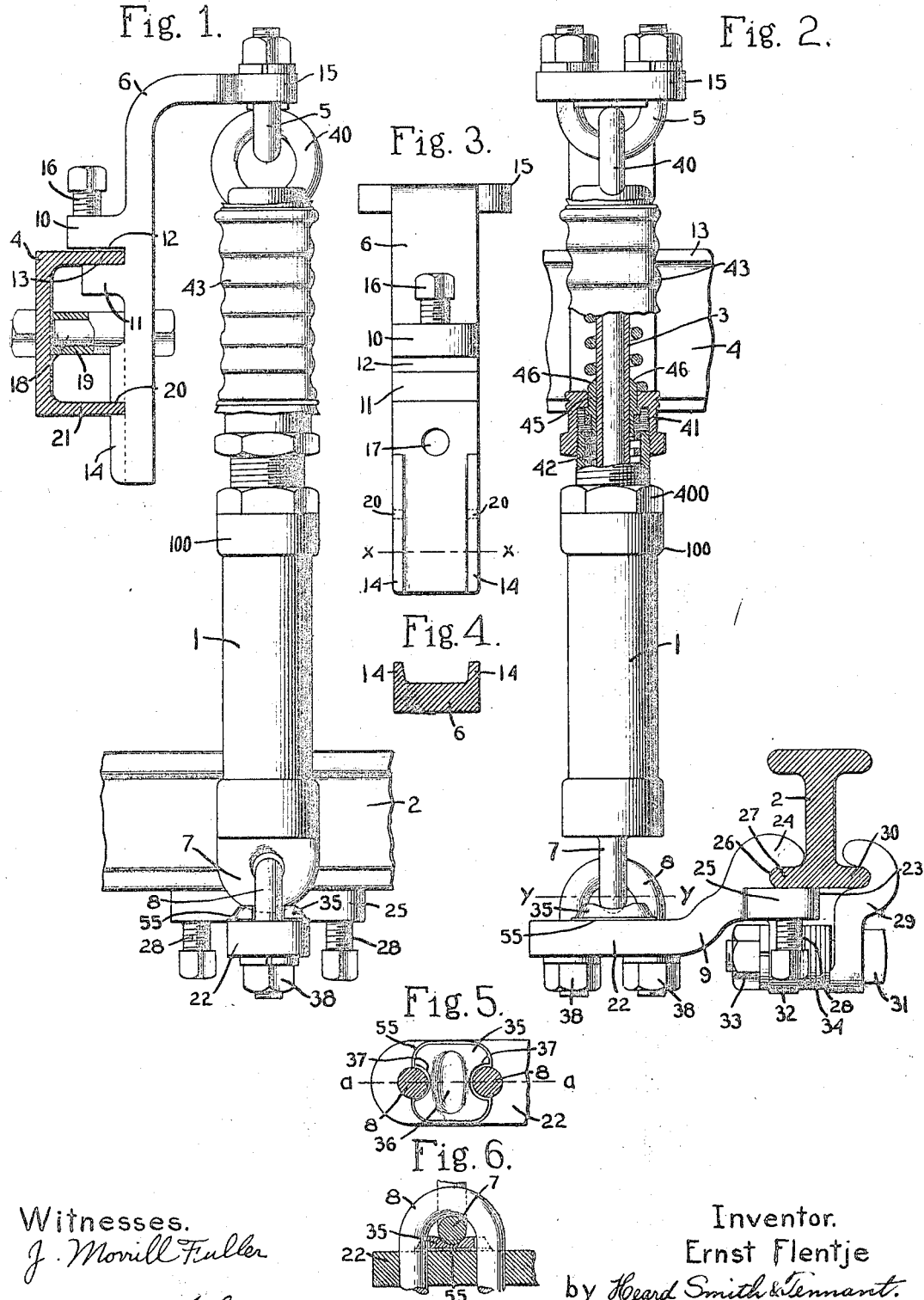

ERNST FLENTJE, OF CAMBRIDGE, MASSACHUSETTS.

HANGER FOR SHOCK-ABSORBERS.

1,137,598.  Specification of Letters Patent.  Patented Apr. 27, 1915.

Application filed October 30, 1914. Serial No. 869,469.

*To all whom it may concern:*

Be it known that I, ERNST FLENTJE, a citizen of the United States, residing at Cambridge, county of Middlesex, State of Massachusetts, have invented an Improvement in Hangers for Shock-Absorbers, of which the following description, in connection with the accompanying drawing, is a specification, like characters on the drawing representing like parts.

This invention relates to hangers for shock absorbers, and it has for its object to provide an improved hanger mechanism for connecting the shock absorber to the chassis and axle of an automobile, which hanger mechanism is so constructed that it can be applied without difficulty to anyone of a variety of makes of automobiles, thus obviating the necessity of special hangers being designed for each different kind of automobile.

In order to give an understanding of my invention, I have illustrated in the drawings a selected embodiment thereof which will now be described, after which the novel features of the invention will be pointed out in the appended claims.

Figure 1 is a view of the shock absorber and the hanger therefor, said view showing in section the girder or side member of the chassis to which the hanger is secured, and showing also a portion of the axle; Fig. 2 is a view similar to Fig. 1 looking at right angles thereto; Fig. 3 is a side view of the upper hanger member; Fig. 4 is a section on the line $x$—$x$, Fig. 3; Fig. 5 is a section on the line $y$—$y$, Fig. 2. Fig. 6 is a section on the line $a$—$a$, Fig. 5.

I have shown at 100 a shock absorber of the dash-pot variety which comprises a cylinder 1 connected at its lower end to the axle 2 of the automobile and having operating therein a piston, the piston rod 3 of which is connected at its upper end by a suitable hanger to the side sill 4 of the chassis. The shock absorber herein shown is substantially like that illustrated in my Patent No. 1,045,136, dated November 26, 1912. The upper end of the piston rod is provided with an eye 40 which is swiveled to a staple 5 carried by the upper hanger member 6 that is connected to the portion 4 of the chassis. The lower end of the cylinder 1 is also provided with an eye 7 that is swiveled to a staple 8 carried by the lower hanger member 9 that is connected to the axle 2. Both hanger members 6 and 9 are designed so that they can be readily applied to the side sill 4 and axle 2 of different kinds and sizes of automobile. In nearly every automobile now manufactured the chassis is constructed with a channel-shaped side sill, but the sides of the channel member vary with different styles and makes of automobiles. Similarly the front axle of most automobiles has an I-beam shape, but the size and dimensions vary in different kinds of automobile. My improved upper hanger 6 is of such a construction that it can be applied to the channel-shaped side sill of the chassis regardless of the size thereof, and the application of the device to the side sill necessitates drilling only a single hole through said side sill. The hanger member 6 is provided with an upright body portion having two transversely-extending flanges 10 and 11 which are spaced apart to provide a groove 12 of a size to receive the leg or flange 13 of the channel member 4, this groove being of a sufficient width to receive the flange 13 of the largest channel member used in automobile construction. The hanger 6 is also provided with two vertically-extending ribs 14, one at each side thereof, and with the overhanging portion or head 15 to which the staple 5 is secured in usual manner. The flange 10 is provided with a set-screw 16 which extends vertically therethrough and is adapted to be clamped against the upper face of the channel-iron flange 13 when the hanger is in place. The hanger is also provided with an opening 17 to receive a clamping bolt 18 which extends through the channel-iron and hanger member, a spacing sleeve 19 of proper length being preferably placed about the bolt 18 between the channel member and the hanger device.

In applying the hanger to the chassis the measurement of the channel-iron member 4 is taken and then slots 20 are filed or otherwise cut in the flanges 14 at a proper distance from the groove 12 to receive the lower leg 21 of the channel member 4 of the particular automobile to which the device is to be applied, and a hole is then drilled through the channel member 4 to receive the bolt 18. The hanger may then be secured in place to the channel member 4, and when thus secured it is provided with means which embrace both legs 13 and 21 of the channel member 4 and it is clamped firmly to the channel member by the clamping bolt 18. The set-screw 16 takes up any loose play between the leg 13 of the channel member and the groove 12 and together with the clamping bolt 18 holds the hanger firmly secured to the channel member. Since the hanger member is made without the slot 20 cut therein, it is possible to apply the hanger to the channel member of any automobile by simply forming in the ribs 14 the slots 20 at the proper distance from the groove 12 to receive the edge of the channel-iron. The lower hanger 9 is also constructed to be secured to an I-beam member of any size.
This hanger member 9 is provided with a portion 22 to which the staple 8 is secured and with a head portion 23 having two jaws 24 and 25 forming between them a groove 26 to receive the flange 27 of an I-beam, the jaw 25 extending beyond the jaw 24 and engaging the under side of the I-beam. This jaw 25 has a greater extent transversely of the hanger than the jaw 24, and it carries two set-screws 28 that are adapted to be screwed against the underside of the I-beam to take up loose play. The lower hanger member also includes a clamping member 29 having a shape to embrace the other flange 30 of the I-beam and means for tightening the clamping member to cause said member and the head 23 to firmly grip the lower flanges of the I-beam member. The means herein shown is a clamping bolt 31 which extends through an aperture in the lower end of the clamping member 29 and through a lug 32 depending from the clamping member 9, said clamping bolt carrying a nut 33 by which it may be clamped tight. The groove 26 is sufficiently large to receive the flange 27 of I-beams of different sizes and any loose play is taken up by the set-screws 28. The clamping bolt 31 permits the clamping member 29 to be adjusted different distances from the head 23, thus enabling the device to be applied to I-beams of different sizes. I will preferably place a spacing device 34 between the lug 32 and the clamping member 29, which spacing device will fill the space between said member and lug when the device is firmly clamped to the I-beam member. I find it convenient to use washers for this spacing device because any desired number of washers can be used to fill the space.
A hanger having the above construction can be readily applied to any automobile and firmly secured thereto and thus one type of hanger will answer for various types of automobiles.
The loop and staple connection 7, 8 between the shock absorber and the lower hanger member 9 is intended to provide the necessary flexibility between these parts to provide for the movement of the automobile body. It is very desirable, however, that there should be no lost play at this point, for otherwise there will be a constant noise or rattle produced. In order to provide the necessary flexibility without any lost motion, I propose to employ a seat member 35 which rests on the portion 22 of the lower hanger member and which is provided with a rounded seat 36 in which the lower end of the loop 7 rests, this seat member having a slight movement laterally on the portion 22 of the hanger to allow for the relative movements of the loop 7 and hanger. I preferably form this seat member of bronze or some composition which will provide a wearing surface for the iron loop 7 that will require no lubrication, and said seat member is formed at its opposite sides with the recesses 37 in which the sides of the staple 8 are received, as shown clearly in Fig. 5, these recesses being large enough to allow a certain amount of lateral movement of the seat member on the portion 22 in both directions. With this construction I find that the staple can be set up tight by means of its nuts 38 thereby preventing any lost motion in a vertical direction between the loop 7 and staple 8 and thereby obviating all noise and rattle and yet have a sufficiently flexible joint at this point which will allow the relative movements between the shock absorber and its lower hanger which inevitably occurs as the automobile body moves relative to the axle.

I have herein shown a plate 55 situated between the seat member and the portion 22, said plate being made of phosphor-bronze or some other similar material which will permit the seat member to have a comparatively free movement thereover. It is desirable that the seat member should move with more or less freedom, even though the loop 9 is clamped tightly thereagainst, and the contact of the seat member with iron produces much more frictional resistance than will be produced by introducing the plate 55 between the seat member and the portion 22.

In the construction herein illustrated the piston rod 3 extends through a stuffing box 400 having a cap 41 secured thereto which bears against a spring 42 that in turn acts against the packing, not shown, all as illustrated in my former Patent No. 1,045,136. The piston rod is also shown as inclosed in a flexible casing or boot 43 which is connected at one end to the cap 41 and at the other end to the upper end of the piston rod. It sometimes happens that this boot or casing becomes broken and that the dust or dirt to which the device is subjected accumulates on the cap and on the piston rod and tends to wear the aperture through the cap so as to allow some loose play. To obviate this, I provide the cap 41 with a bushing 45 which is removably secured to the cap and which projects therethrough, and the upper end 46 of which is beveled, as shown, this beveled end acting as a deflector to clean or scrape off the dirt or dust accumulating on the piston rod as the latter descends and deflect said dirt outwardly away from the piston rod. This prevents the dirt from accumulating in a corner and being drawn into the aperture in the cap by the downward movement of the piston rod. Any wear which occurs will be received by this bushing 45, and when it becomes worn so that it is unfit for further use, it can be readily taken out from the cap 41 and a new bushing put in its place.

While I have illustrated herein a selected embodiment of my invention, I do not wish to be limited to the constructional features shown.

I claim:

1. A hanger member for a shock absorber comprising a body portion provided at its upper end with an overhanging head to which the shock absorber is secured and also provided with two transversely-extending flanges forming between them a groove to receive one leg of a channel-iron member, said body portion being provided below said flanges with two vertically-extending ribs having notches to receive the lower leg of the channel-member, and means to clamp said hanger to said member.

2. A hanger member for a shock absorber comprising a body portion provided at its upper end with an overhanging head to which the shock absorber is secured and also provided with two transversely-extending flanges forming between them a groove to receive one leg of a channel-iron member, said body portion being provided below said flanges with two vertically-extending ribs having notches to receive the lower leg of the channel-member, means to clamp said hanger to said member, and a set-screw carried by one of said transverse flanges to take up loose play.

3. A hanger for shock absorbers comprising a member having a laterally-extending portion to which the shock absorber is secured and presenting at one end a head having two jaws to embrace the flange of an I-beam axle member, one of said jaws carrying set-screws, a clamping member adapted to embrace the other flange of the I-beam member, and means to clamp said clamping member to the head.

4. A hanger for shock absorbers comprising a member having a laterally-extending portion to which the shock absorber is secured and presenting at one end a head having two jaws to embrace the flange of an I-beam axle member, one of said jaws carrying set-screws, said hanger member also having a downwardly-directed lug, a clamping member constructed to embrace the other flange of said I-beam axle member, a clamping bolt extending through said clamping member and said lug, and spacing means between the lug and clamping member.

5. A hanger member for shock absorbers provided with means by which it can be secured to the axle of an automobile and also provided with a laterally-extending portion, a staple carried by said portion and to which the eye of a shock absorber is swiveled, and a seat member resting on the hanger member and having a curved seat on which said eye rests, said seat member being held in place by the staple but capable of having slight lateral movement thereon.

6. A hanger member for shock absorbers provided with means by which it can be secured to the axle of an automobile and also provided with a laterally-extending portion, a staple carried by said portion and to which is swiveled the eye of a shock absorber, and a seat member resting on the hanger member and having a curved seat on which said eye rests, said seat member having recesses in opposite sides in which the arms of the staple are received, said recesses being of sufficient size to permit a slight lateral play of the seat member.

In testimony whereof I have signed my name to this specification in the presence of two subscribing witnesses.

ERNST FLENTJE.

Witnesses:
 Louis C. Smith,
 Thomas J. Drummond.